United States Patent
Atwal et al.

(10) Patent No.: US 10,169,746 B2
(45) Date of Patent: Jan. 1, 2019

(54) METHODS, SYSTEMS, AND COMPUTER READABLE MEDIA FOR INTEGRATING PAYMENTS

(71) Applicant: MasterCard International Incorporated, Purchase, NY (US)

(72) Inventors: Gurpreet Singh Atwal, Somers, NY (US); Richard Lee Jackson, Newburgh, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 668 days.

(21) Appl. No.: 14/704,598

(22) Filed: May 5, 2015

(65) Prior Publication Data

US 2016/0328690 A1   Nov. 10, 2016

(51) Int. Cl.
  *G06Q 20/00* (2012.01)
  *G06Q 20/14* (2012.01)
  (Continued)

(52) U.S. Cl.
  CPC ........... *G06Q 20/14* (2013.01); *G06Q 20/023* (2013.01); *G06Q 20/0855* (2013.01);
  (Continued)

(58) Field of Classification Search
  CPC .............................. G06Q 20/00; G06Q 20/382
  (Continued)

(56) References Cited

U.S. PATENT DOCUMENTS

| | | |
|---|---|---|
| 4,803,632 A | 2/1989 | Frew et al. |
| 6,980,973 B1 | 12/2005 | Karpenko |

(Continued)

FOREIGN PATENT DOCUMENTS

| | | |
|---|---|---|
| CN | 201364616 Y | 12/2009 |
| CN | 203055025 U | 7/2013 |

(Continued)

OTHER PUBLICATIONS

Beikverdi et al., Alireza, "Centralized Payment System Using Social Networks Account", 2014 IEEE Fourth International Conference on Big Data and Cloud Computing, Dec. 1, 2014, IEEE, pp. 493-499 (Year: 2014).*

(Continued)

*Primary Examiner* — Eric T Wong
*Assistant Examiner* — Kevin T Poe
(74) *Attorney, Agent, or Firm* — Jenkins, Wilson, Taylor & Hunt, P.A.

(57) ABSTRACT

Methods, systems, and computer readable media for integrating payments are disclosed. An exemplary method includes a payment integrator device including at least one processor for receiving instructions to connect to a plurality of privately hosted servers associated with a plurality of different third-party providers and receiving, from the plurality of privately hosted servers, billing information associated with a plurality of different accounts. The method further includes, at the payment integrator, prompting a user to select a payment type for use in paying a first bill associated with a first account of the plurality of different accounts and sending a first payment to the first account according to the first payment type.

18 Claims, 4 Drawing Sheets

(51) Int. Cl.
  G06Q 20/22 (2012.01)
  G06Q 20/32 (2012.01)
  G06Q 20/40 (2012.01)
  G06Q 20/36 (2012.01)
  G06Q 20/38 (2012.01)
  G06Q 20/02 (2012.01)
  G06Q 20/08 (2012.01)

(52) U.S. Cl.
  CPC ......... *G06Q 20/145* (2013.01); *G06Q 20/227* (2013.01); *G06Q 20/3278* (2013.01); *G06Q 20/3674* (2013.01); *G06Q 20/382* (2013.01); *G06Q 20/401* (2013.01)

(58) Field of Classification Search
  USPC .......................................................... 705/64
  See application file for complete search history.

(56) References Cited

U.S. PATENT DOCUMENTS

| | | | |
|---|---|---|---|
| 7,840,493 | B2 | 11/2010 | Neri-Badillo |
| 8,527,407 | B1 | 9/2013 | Yadav-Ranjan |
| 8,606,720 | B1* | 12/2013 | Baker et al. ........... G06Q 20/00 705/64 |
| 2004/0122773 | A1* | 6/2004 | McCombs ........... G06Q 20/123 705/52 |
| 2004/0243524 | A1 | 12/2004 | Crichlow |
| 2005/0010523 | A1* | 1/2005 | Myklebust et al. . G06Q 20/102 705/40 |
| 2006/0267574 | A1 | 11/2006 | Howard |
| 2007/0083465 | A1 | 4/2007 | Ciurea et al. |
| 2007/0106564 | A1 | 5/2007 | Matotek et al. |
| 2009/0089193 | A1* | 4/2009 | Paintin .................. G06Q 20/02 705/34 |
| 2011/0047036 | A1 | 2/2011 | Foran-Owens et al. |
| 2011/0131102 | A1* | 6/2011 | Wang ..................... G06Q 20/10 705/16 |
| 2012/0226605 | A1 | 9/2012 | Veerubhotla |
| 2013/0054473 | A1* | 2/2013 | Jan ..................... G06Q 20/3223 705/71 |
| 2013/0085936 | A1* | 4/2013 | Law ....................... G06Q 20/04 705/40 |
| 2013/0124406 | A1* | 5/2013 | Poplawski ............. G06Q 20/04 705/40 |
| 2013/0262236 | A1 | 10/2013 | Kwak |

FOREIGN PATENT DOCUMENTS

| | | |
|---|---|---|
| CN | 103617717 A | 3/2014 |
| JP | 2000-276531 A | 10/2000 |
| JP | 2004-139255 A | 5/2004 |
| JP | 2014-135036 A | 7/2014 |
| WO | WO 2013/096668 A2 | 6/2013 |
| WO | WO 2013/115663 A4 | 8/2013 |

OTHER PUBLICATIONS

Abedellaoui et al., R, "Integration of new electronic payment systems into B2C internet commerce", 2011 International Conference on Collaboration Technologies and Systems, May 1, 2011, pp. 484-491 (Year: 2011).*

Xianhua, Xu, "Virtual card payment protocol and risk analysis using performance scoring", Proceedings 15th International Parallel and Distributed Processing Symposium, Jan. 1, 2011, IPDPS 2001, p. 7 (Year: 2001).*

Notification of Transmittal of the International Search Report and the Written Opinion of the International Searching Authority, or the Declaration for International Application No. PCT/US2016/030629 (dated Jul. 19, 2016).

* cited by examiner ions, an exemplary system for integrat-
METHODS, SYSTEMS, AND COMPUTER READABLE MEDIA FOR INTEGRATING PAYMENTS

TECHNICAL FIELD

The subject matter described herein relates to improved methods and systems for billings and payments. More particularly, the subject matter described herein relates to systems, methods, and computer readable media for integrating multiple payments.

BACKGROUND

Currently, various billing and payment services and/or products exist for processing payments sent to merchants and/or service providers. Current billing and payment implementations require a customer to log in to a specific account, view the account statement, specify a payment type, and authorize a payment to the specific merchant or service provider. Credit or debit card account information may then be stored on the merchant or service provider's server for processing future payments. This is problematic, as the server may experience outages and/or become susceptible to security breaches (e.g., the TARGET® data breach compromised millions of credit card numbers as well as direct deposit accounts (DDAs).). Moreover, the customer must log in to multiple accounts for processing payments to multiple different service providers; this is especially true for residential utilities such as gas, electric, and water services that are provided by different entities. This process is both time consuming and tedious, as a customer must recall multiple usernames and/or passwords to pay bills via multiple online accounts. The customer must also mentally or manually keep track of when a payment for a bill is due.

Other exemplary billing and payment implementations and/or products enable banking account users or customers to make multiple payments online via their banking account, without having to log in to multiple merchant or service provider websites. This is problematic, as the user's bank account must be linked directly to the multiple service providers, which increases the risk of account fraud and/or hacking. Similar to the case above, a user must also mentally and/or manually keep track of the multiple payment due dates.

Accordingly, there exists a need for improved methods, systems, and computer readable media for integrating multiple different payments, for example, including but not limited to payments for receiving utilities or services.

SUMMARY

According to one aspect, the subject matter described herein relates to, methods, systems, and computer readable media for integrating payments. An exemplary method for integrating payments includes, at a payment integrator (e.g., device or system) including at least one processor, receiving instructions for connecting to a plurality of privately hosted servers associated with a plurality of different third-party providers. The method further comprises receiving, from the plurality of privately hosted servers, billing information associated with a plurality of different accounts. The method further comprises, in response to receiving the billing information, prompting a user to select a payment type for use in paying a first bill associated with a first account of the plurality of different accounts. The method further comprises sending a first payment to the first account according to the first payment type.

In some embodiments, an exemplary system for integrating payments includes a payment integrator comprising at least one processor and a communications interface. The payment integrator is configured to receive, via the communications interface, instructions for connecting to a plurality of privately hosted servers associated with a plurality of different third-party providers. The payment integrator is further configured to and receive, from the plurality of privately hosted servers, billing information associated with a plurality of different accounts. In response to receiving the billing information, the payment integrator prompts a user, via the communications interface, to select a payment type for paying a first bill associated with a first account of the plurality of different accounts. The payment integrator electronically sends a first payment to the first account according to the first payment type.

The subject matter described herein may be implemented in hardware, software, firmware, or any combination thereof. As such, the terms "function", "node", or "module" as used herein refer to hardware, which may also include software and/or firmware components, for implementing the features being described. In one exemplary implementation, the subject matter described herein may be implemented using a non-transitory computer readable medium having stored thereon computer executable instructions that when executed by the processor and memory of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, methods, systems, and computer readable media for integrating multiple payments are provided. In some embodiments, multiple utility payments (e.g., payments for personal, residential, and/or commercial services) may be integrated for processing and payment via systems and methods disclosed herein. A customer may optionally be notified or alerted as to when a payment is due, prompted for payment, and receive a communication that one or more utility payments were made. Integrating multiple payments advantageously obviates the need for a customer to log in to multiple accounts and/or set reminders for when bills are due.

Methods and systems provided herein also advantageously allow a customer to complete multiple payment transactions either individually or simultaneously, thereby simplifying and improving the efficiency of completing multiple payment transactions. Notably, unencrypted payment information (e.g., a credit card or account number) is not required to be stored on either on a local or remote server, rather, encrypted (e.g., hashed or tokenized) payment information is locally stored at the customer's location or site on a payment integrator. Notably, methods, systems, and computer readable media described herein include agnostic payment integration technology, which can be generalized for interoperability among various vendors, merchants, and/or service providers and/or equipment associated therewith.

The term "payment integrator" refers to module on which multiple bills are integrated for payment processing, and may include hardware, software, and/or firmware components.

The term "utility" refers to a good and/or a service obtained from any and all residential, commercial, private, or public service providers, including but not limited to, for example, electricity or electrical power, gas, wired or wireless telephone, television (TV) service (e.g., via cable, satellite, streaming, fiber, etc.), Internet, water, sewage, trash and/or recycling collection, home security monitoring, lawn care, etc., and the like.

Figure 1:
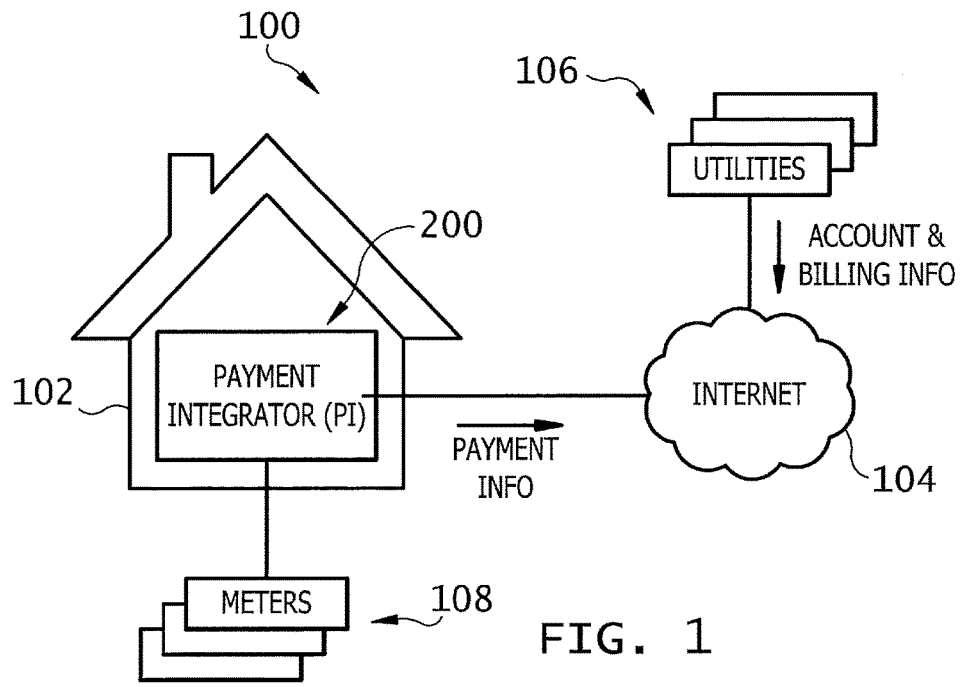
FIG. 1 is a schematic diagram illustrating an exemplary network in which payments may be integrated according to an embodiment of the subject matter described herein.

FIG. 1 depicts a schematic diagram illustrating an exemplary environment or network 100 in which multiple bills and/or payments may be integrated according to an embodiment of the subject matter described herein. Network 100 includes a customer site 102, which may include a private residence, any individual location, a commercial business location, or the like. Customer site 102 may interface with one or more third-party goods or service providers via the Internet 104. In some embodiments, the service providers may include multiple public or private utility companies, generally designated "utilities" 106. Utilities 106 may include a vendor specific account and/or billing server configured to maintain billing and account information associated with providing a public or private service utility (e.g., gas, water, heat, electrical power, etc.) to customer site 102 as described herein.

In some embodiments, utilities 106 are configured to send online billing and/or account information to customer site 102 via Internet 104. Account and/or billing information may include any information associated with a specific customer account not limited to, for example, a customer account number, an account balance, a minimum payment amount, an account statement, a payment due date, etc. Account and/or billing information may be received at a Payment Integrator (PI), generally designated 200, which is described in more detail in FIG. 2. Notably, PI 200 includes agnostic technology configured to interoperate with multiple different vendor-specific utilities 106.

Still referring to FIG. 1 and in some embodiments, PI 200 is located, installed, provided, and/or otherwise disposed at customer site 102. PI 200 is configured to receive account and billing information from a plurality of multiple, different utilities 106 and integrate the account and billing information at one specific device, system, and/or location. PI 200 is configured to transmit payment information to utilities 106 via the Internet 104. Payment information may include encrypted account numbers, encrypted banking information, encrypted credit or debit card information, a payment amount, a payment date, etc. In some embodiments, utilities 106 (e.g., specific utility billing and/or account server) and PI 200 exchange billing and payment information, respectively, via an application programming interface (API) configured to assist otherwise distinct applications with sharing data. Notably, PI 200 includes an agnostic device or system including functionality for integrating data and exchanging information with a variety of different service provider (e.g., vendor specific) technology or equipment.

In some embodiments, PI 200 includes functionality for monitoring the usage of multiple utilities 106 either by leveraging existing API information (e.g., via polling APIs) to poll utilities 106 for specific account and/or billing information. In other embodiments, PI 200 includes functionality for monitoring the usage of multiple utilities via receiving utility usage information directly from one or more utility meters, generally designated 108. When a payment for a utility is due, PI 200 is configured to make a noise, vibration, sound, or visually display the payment information to a customer at customer site 102. In some embodiments, PI 200 includes functionality for integrating multiple bills, so that a customer may make one or more tap-and-go payments to pay one or more utility bills. In other embodiments, PI 200 includes functionality for integrating multiple bills and payments, and providing the customer with the option to pay one bill at a time, for example, via multiple tap-and-go payments. Alternatively, a customer may pay multiple bills or payments simultaneously via a single tap-and-go payment. Payments are not limited to contactless tap-and-go payments, but may include any type of payment (e.g., swiping magnetic readable cards, etc.).

PI 200 includes functionality for receiving (reading) a contactless or tap-and-go payment from the customer via a contactless Near Field Communication (NFC) type of reader or any other suitable payment interface disposed thereon (e.g. magnetic card reader, NFC reader, barcode reader, etc.). PI 200 is configured to transmit or send confirmation that a payment was made directly to the customer via an electronic message (e.g., via email), a Short Message Service (SMS) message, a Multimedia Message Service (MMS) message, combinations thereof, and/or any other suitable messaging technology. Notably, PI 200 includes functionality for providing a Point of Sale (POS) system directly within customer site 102 thereby exchanging and integrating billing and payment information associated with a variety of different, remote vendors or utilities 106. PI 200 also includes functionality for storing encrypted payment information locally thereon, for example, via a memory element or storage device. This obviates the need for a customer to either link a bank account to a payment server and/or remotely store credit card information on a remote utility (vendor or merchant) server. Methods and systems herein provide for more secure transactions, and a more robust payment option.

It will be appreciated that FIG. 1 is for illustrative purposes only and that various components, their locations, and/or their functions described above in relation to FIG. 1 may be changed, altered, added, or removed. For example, some components and/or functions may be separated or combined into one entity, e.g., PI 200 or some functionality thereof may be segregated from customer site 102 and/or integrated with any other entities associated with system 100.

Figure 2:
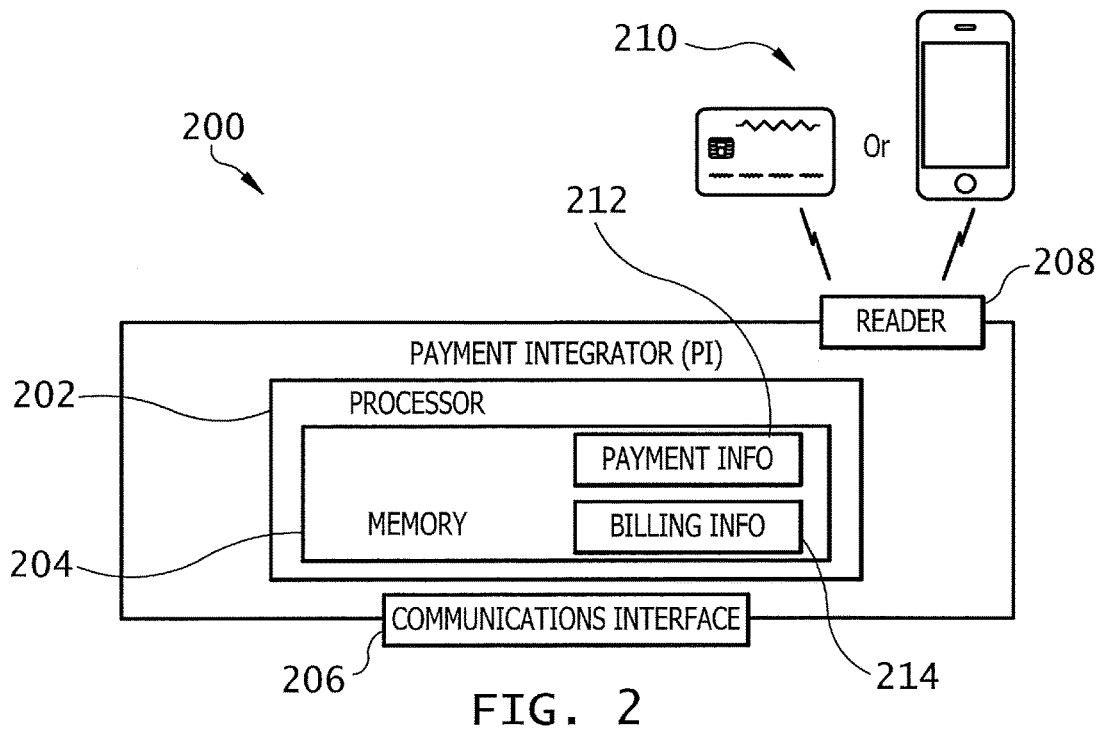
FIG. 2 is a block diagram illustrating an exemplary system for integrating payments according to an embodiment of the subject matter described herein.

FIG. 2 is a block diagram illustrating an exemplary system for integrating payments according to an embodiment of the subject matter described herein. FIG. 2 illustrates PI 200, which includes a system or device for payment integration. In some embodiments, PI 200 includes a dockable or mountable system or device that is installed within a customer's residence or place of business (e.g., customer site 102, FIG. 1) for providing a local payment interface by which multiple different payments can be initiated and processed. In some embodiments, a customer may interface with PI 200 to initiate and process a plurality of integrated utility bills and/or payments.

PI 200 may include a computing platform, node, module, computing device (e.g., a computer, mobile phone, tablet, etc.), etc., that is configured to receive billing information from a plurality of different sources stored on a plurality of different, third-party remote servers via the Internet, and integrate the bills for payment locally thereon. Notably, payments may be integrated locally on one device, thereby enabling a customer to view multiple bills and complete multiple payment transactions. In some embodiments, PI 200 includes a computing device configured to visibly display multiple payments (e.g., via a graphical user interface (GUI), monitor, screen, etc.) integrated therewith and optionally audibly, visibly, or physically (e.g., vibration) alert the customer, in real time, when a payment is due for each account. Once the customer is aware of a payment, the customer, or a proxy for the customer, may interface with PI 200 for transacting a payment to satisfy one or more bills.

In some embodiments, PI 200 includes a processor 202 and memory 204 (e.g., a memory element or device) for executing software to exchange information (e.g., via an API-API exchange), for example, to receive billing and/or account information and transmit payment information. In some embodiments, processor 202 includes a microprocessor, a central processing unit (CPU), or any other similar hardware-based processor unit that is configured to execute and/or utilize software to communicate with multiple third-party providers (e.g., or servers associated therewith) for initiating and processing multiple payments.

In still further embodiments, PI 200 includes a hardware computing device including a communications interface 206 by which a customer makes a payment to one or more utility providers. Communications interface 206 may include a visual display, a keypad, a keyboard, a touchscreen, a speaker, a mouse, and/or any other type of interface having functionality for visibly, audibly, or physically alerting the customer when a payment is due, where desired. Thus, PI 200 is configured to receive an indication that a customer owes a payment, and to receive an indication form the customer to initiate and process at least one payment. Communications interface 206 may also include functionality for sending details (e.g., confirmation of the payment amount and/or date) associated with each payment transaction directly to the customer via an electronic message (e.g., email), an SMS (text) message, a MMS message, or the like.

In some embodiments, communications interface 206 includes a management console by which billing or account information is visually displayed and identified or selected (e.g., via a keyboard, mouse, touchscreen, etc.) to initiate payment. Upon receiving an indication to pay a bill from the customer via communications interface 206, PI 200 is configured to complete one or more payment transactions integrated thereon. In some embodiments, a customer may make one or more one-time payments via a touchscreen (e.g., communications interface 206) to select the amount, date, and payment method (e.g., entered or stored) used to process one or more given bills. Confirmation of the payment(s) may then be visually displayed to the customer via communications interface 206, or optionally sent to the customer according to a preferred communication method (e.g., email, text message, etc.). Although only one communications interface 206 is illustrated in FIG. 2, one or more additional communications interfaces 206 may be provided whereby connections to the Internet and other remote servicers are established. That is, communications interface 206 may include an Internet connection, or an interface whereby a connection to the Internet is facilitated.

In some embodiments, PI 200 includes functionality for actively reading or polling a plurality of utility APIs to determine a date of when a payment is due and a billed amount thereby replacing standard billing methods and systems (e.g., paper or emailed billing methods). Notably, PI 200 is configured to leverage existing utility APIs for reading, polling, and/or parsing information from third-party servers to obtain specific account and billing information as well as convey payment information to the various third-party servers. PI 200 includes functionality for connecting to the Internet (e.g., 104, FIG. 1) and exchanging information with any third-party server, and is not limited to communication with one specific third-party server.

Still referring to FIG. 2 and in some embodiments, PI 200 includes a reader 208. Reader 208 may include a NFC reader for reading NFC enabled payment devices, a magnetic card stripe reader, a wireless smartcard reader, a wireless device reader, or the like. Reader 208 is configured to read payment information or signals transmitted by a payment card, instrument, or element 210 and/or any type of suitable payment object (e.g., a magnetic stripe card, a wireless smartcard, a NFC enabled device or application, a NFC fob, etc.) for initiating and processing payments from the customer to one or more third-party providers (e.g., utility providers). In some embodiments, reader 208 includes a contactless, tap-and-go NFC chip reader.

In some embodiments, payment information 212 and integrated billing information 214 may be stored in memory 204 (e.g., a memory element or device) of PI 200, such as a random access memory (RAM), a read only memory (ROM), an optical read/write memory, a cache memory, a magnetic read/write memory, a flash memory, or any other non-transitory storage media. In one embodiment, processor 202 and memory 204 may be used to execute and manage the operation of PI 200. In some embodiments, memory 204 includes any medium that is configured to locally store customer profile and/or payment data used in initiating and processing payments to multiple different third-party providers (e.g., utility providers). In some embodiments, payment information includes a customer identifier (e.g., a name or code), a customer account number, a payment type and/or a payment identifier (e.g., a payment card or account number), a payment amount, etc.

Notably, the payment identifier (e.g., a credit card number, an account number, or banking information) may be locally read, encrypted, and stored on PI 200 as payment information 212 to minimize account hacking or fraud associated with a security breach. A payment identifier (e.g., a card number, an account number, etc.) may be encrypted via hashing (e.g., localized, one-way hashing), tokenization, or the like, and stored in memory 204 as payment information 212. Thus, PI 200 obviates the need to remotely store sensitive, private payment or account information. In addition to this, payments may be made using the encrypted information so that actual (e.g., unencrypted) account numbers and/or banking information is not transmitted to the remote servers. The encrypted information may be locally stored as payment information 212 in memory 204 of PI 200.

In some embodiments, account and/or billing information 214 may be integrated and stored in memory 204 for more efficient payment of bills. A user does not have to log into an account and/or link banking information in order to pay one or more bills. PI 200 is configured to receive electronic billing information directly from one or more remote servers associated with multiple third-party providers, integrate and store the received billing information 214, and present the billing information to a customer. The customer may make one or more one-time contactless payments in response to being prompted or PI 200 may pay bills on behalf of the customer, where desired.

In some embodiments, PI 200 includes a hardware unit configured to monitor, receive, read, process, and/or complete multiple transactions including, inter alia, purchases for various public, private, and/or residential utilities not limited to services for gas, power, water, sewer, television, Internet, telephone, mobile telephone, lawn care, etc. One non-limiting example of PI 200 includes a MasterCard® PayPass™ enabled device, system, or network element associated with MasterCard International Incorporated of Purchase, N.Y., USA, which facilitates the implementation of contactless readers to monitor and/or manage payments made to various third-party providers. In some embodiments, PI 200 is configured to monitor customer accounts via leveraging APIs and automatically submit payments on a customer's behalf. In other embodiments, a customer instructs PI 200 to initiate one-time payments via interfacing a payment instrument or element 210 with reader 208 to conduct a payment.

In some embodiments, PayPass™ technology, when utilized by PI 200, includes a radio frequency (RF) enabled contactless payment platform, which allows customers to tap or wave a device in front of a special reader in order to process a transaction, or in the instant case, multiple integrated payments either individually to simultaneously. PayPass™ implementations are consistent with the ISO/IEC 14443 Standards and provide a convenient method for incorporation within PI 200.

Although FIGS. 1 and 2 depict PI 200 as a single node or network element, PI 200 may further include a plurality of network elements, a plurality of network components, etc., without departing from the scope of the present subject matter. In some embodiments, PI 200 includes a payment integration system, which may be incorporated with any suitable component or multiple hardware components.

Further, it will be appreciated that FIG. 2 is for illustrative purposes only and that various components, their locations, and/or their functions described above in relation to FIG. 2 may be changed, altered, added, integrated, segregated, or removed. For example, some components and/or functions may be separated or combined into more than one entity.

Notably, PI 200 comprises a special purpose computer device or machine that includes hardware components (e.g., one or more processor units, memory, and network interfaces) configured to execute hardware and software elements (e.g., APIs, modules, etc.) for the purposes of performing one or more aspects of the disclosed subject matter herein. In addition, it should be noted that PI 200 and its components and/or functionality described herein constitute a special purpose computer that improves the technological field pertaining to billing and payment systems by providing mechanisms for integrating multiple payments and enabling payment of multiple bills directly from a customer's business, residence, or the like, without having to actually transmit or send actual (unencrypted) account information. Rather, PI 200 utilizes encrypted payment information that is stored locally on PI 200 for making multiple payments which is more efficient and secure.

Figure 3:
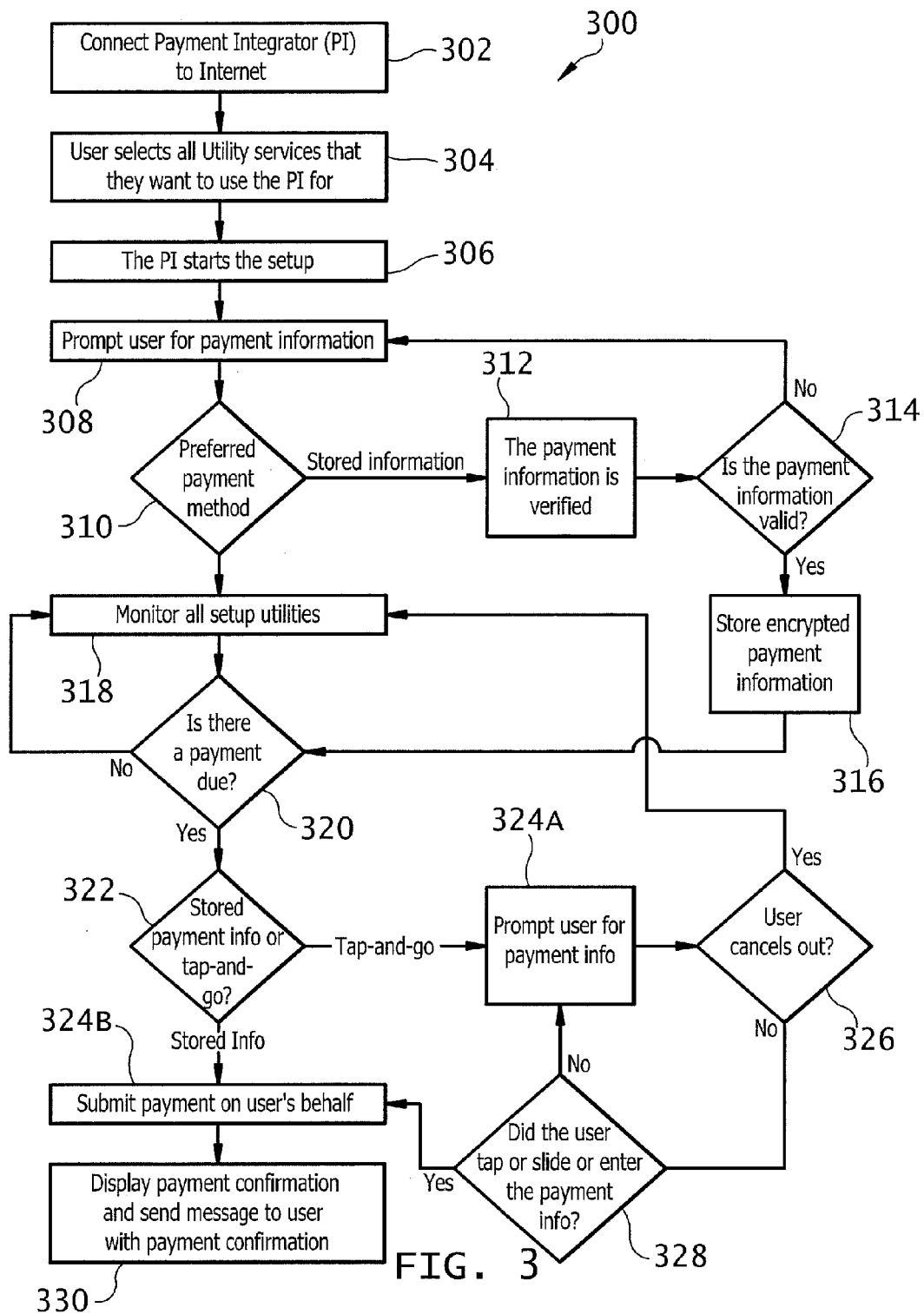
FIG. 3 is a flow chart illustrating an exemplary process flow for integrating payments according to an embodiment of the subject matter described herein.

FIG. 3 is a flow chart illustrating an exemplary process flow 300 for integrating payments according to an embodiment of the subject matter described herein. Process flow 300 includes an exemplary process that for integrating utility bills and/or payments, however, the process may be applied to any service provider or billing entity. In block 302, a customer obtains a payment integrator (PI) device or system (e.g., PI 200, FIG. 2) and connects the PI to the Internet. The PI system may include a wireless interface, a WAN interface, a LAN interface, or the like. The system may include a freestanding device or system, a dockable PI device or system, a mounted device or system, etc., which is provided within a customer's home, residence, place of business, car, etc.

In some embodiments and upon connection to the Internet, the PI may automatically detect or recognize local utility companies or service providers via the Internet. In block 304, the customer may specify or select (e.g., via a console, mouse, touchscreen, map, etc.) one or more providers from a list or map of providers for which they would like to set up billing and payment via the PI. Once a customer selects all of the utility services for which to use the PI, the PI starts the setup process in block 306. In some embodiments, setup includes acquiring the account information (e.g., an account number, a customer identifier, a billing cycle or due date, etc.) for each utility or service provider and determining how to initiate payment of the bills (e.g., automatically or via receipt of contactless, magnetic cards from the customer).

In block 308, the PI prompts the user (customer) for payment information. Payment information may include credit card information, debit card information, prepaid card information, banking account information, etc., or the like. Payment information may be encrypted and stored, or the customer may set up receipt of tap-and-go payments via interfacing a NFC enabled device with a contactless reader.

In block 310, the customer may specify and set a preferred payment method. The PI allows the customer to have a choice in regards to making automatic payments or multiple one-time payments for each utility. The customer also has a choice in regard to a preferred payment method. That is, the customer may prefer to pay using a card (e.g., debit, credit, prepaid, etc.) or banking account information that is encrypted and stored locally on the PI. In further embodiments, the customer may prefer to make multiple spontaneous tap-and-go contactless payments.

The payment information is verified in step 312. In some embodiments, the PI verifies payments using a test payment and reversal.

In block 314, the PI determines whether the payment information is valid. If the payment information is valid, then it is encrypted and stored in step 316. If the information is invalid, then the customer is re-prompted to enter a valid payment type and information again in step 308.

In block 318, the PI monitors all utilities for which it is set up to monitor. The PI may monitor account and/or billing information via polling APIs, interfacing with meters inside or outside the home, or the like.

In block 320, the PI determines if a payment is due. If a payment is due, the PI determines whether to automatically make the payment for the user via the stored payment information or whether to alert and prompt the user for a one-time tap-and-go payment according to block 322. The PI may be preconfigured or programmed for determining whether or not to automatically conduct payment transactions on a customer's behalf. In some embodiments, payments are made according to instructions received from the customer during the setup phase of the PI. The settings may be changed in accordance with ongoing customer needs.

After determining how to process the payment, the PI may prompt the customer to make a one-time, tap-and-go payment according to block 324A. Alternatively, the PI may submit a payment on the customer's behalf according to block 324B.

In block 326, a customer may cancel out a payment if needed (e.g., if an error occurs or a wrong payment method is used). If the customer cancels out the payment, then the PI continues monitoring the various utility accounts according to block 310. If the customer does not cancel the payment, then the PI determines whether the user tapped a payment instrument (e.g., an NFC-enabled device, a fob, a phone, etc.) or interfaced a payment card (e.g., via sliding or the like) in block 328. After the user taps the device or initiates a payment via a card, then the payment is submitted on behalf of the customer in block 324B.

In block 330, the PI is configured to display confirmation of a payment, and optionally send a message to the customer including the payment confirmation. The PI may include a monitoring console or communications interface including a GUI, a screen, a touchscreen, a mouse, a keyboard, etc., for use in processing payments.

It will be appreciated that the exemplary process flow illustrated in FIG. 3 is for illustrative purposes only, and that different and/or additional process flows may be used to perform the actions and/or invoke the functionality illustrated by FIG. 3.

Figure 4A:
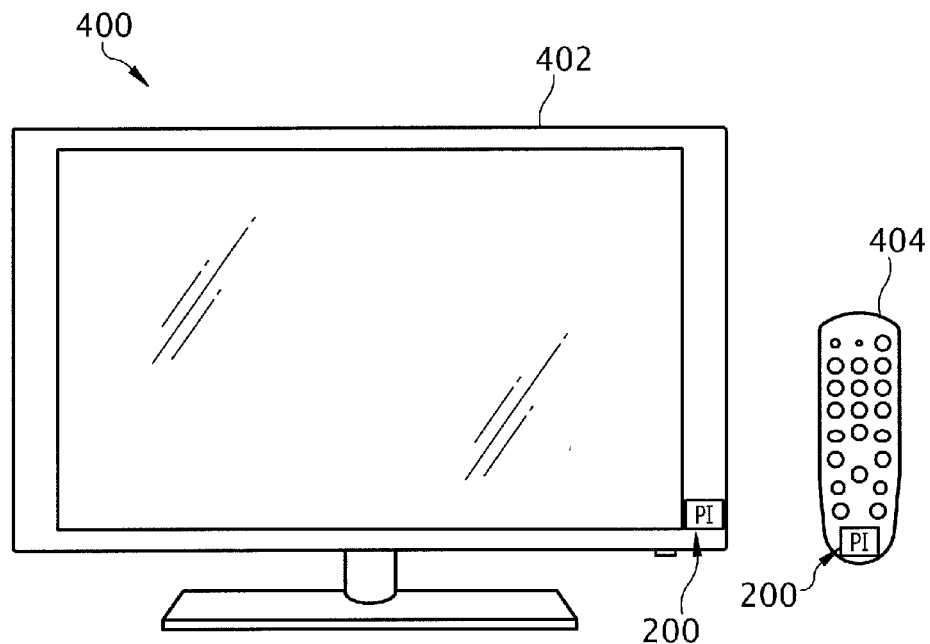
FIGS. 4A and 4B are block diagrams illustrating exemplary systems for integrating payments according to further embodiments of the subject matter described herein.
Figure 4B:
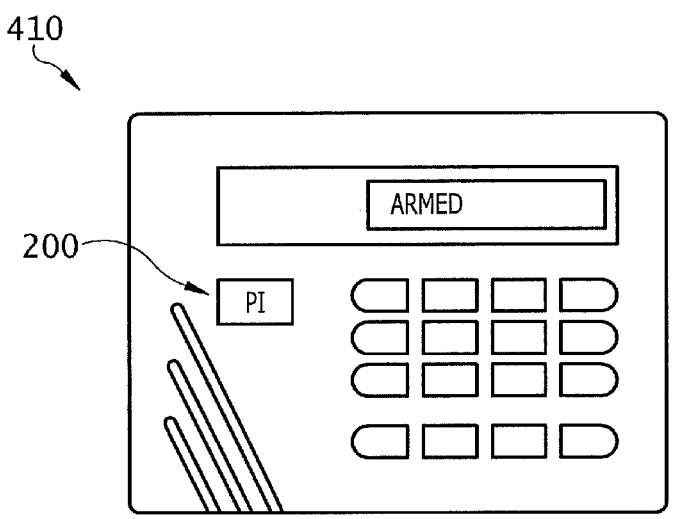

FIGS. 4A and 4B are block diagrams illustrating exemplary systems 400 and 410, respectively, for integrating payments according to further embodiments of the subject matter described herein. System 400 in FIG. 4A illustrates a PI 200 (FIG. 2) placed inside of a television system. PI 200 may be disposed within a television 402 or a remote controller 404 for a television. PI 200 includes functionality for integrating and processing multiple payments via the television 402 or the remote controller 404. PI 200 can be mounted or installed within television 402 or controller 404 and include functionality for reading a customer's payment and sending the payment information to a remote server for making a purchase. Payments made via television 402 or remote 404 may include those for the purchase for an item for sale on the television (e.g., via a home shopping network, or the like) or for a television service, program, network, channel, or pay per view (PPV) access.

In some embodiments, television 402 and/or remote 404 is enabled with a contactless (e.g., NFC) reader and/or any other suitable type of payment interface (e.g., magnetic card reader, wireless smartcard reader, etc.). Television 402 and/or remote 404 may include PayPass™ technology available from MasterCard®. In some embodiments, a customer may interface their credit cards or contactless NFC enabled devices (e.g., phones, key fobs, etc.), on an Internet enabled television 402 or remote 404 for making secure purchases. In addition to television 402, PI 200 may also be disposed within any Internet enabled device such as a tablet, mobile phone, touch screen system within a vehicle, etc.

Notably, PI 200 locally stores encrypted information, so that a customer's account information is not communicated to and/or stored on a remote server. As PI 200 stores encrypted account or payment information, payment transactions are more secure. In some embodiments, a customer may watch television 402 and interface with the television 402 or remote 404 to initiate a payment for goods, services, intangible items (e.g., movies, shows, programming, etc.), food (e.g., ordering a pizza as seen on television 402), etc.

FIG. 4B depicts a payment integration system 410 including PI 200 (e.g., FIG. 2) disposed directly within a home security system control panel 412. In some embodiments, when a bill is due, the customer receives an audible or visual alert. The customer may then walk over to control panel 412 and tap or otherwise interface with PI 200 to pay the bill directly to the service provider. The customer also has the ability to schedule a payment in case they are away on vacation or away from home via control panel 412. PI 200 includes functionality for paying multiple bills, not just bills associated with the home security service received. Notably, anyone other than customer can also initiate and pay the bills on a customer's behalf. PI 200 is functional to receive any type of payment from any account user or cardholder.

Further, it will be appreciated that FIGS. 4A and 4B are for illustrative purposes only and that various components, their locations, and/or their functions described above may be changed, altered, added, integrated, segregated, or removed.

Figure 5:
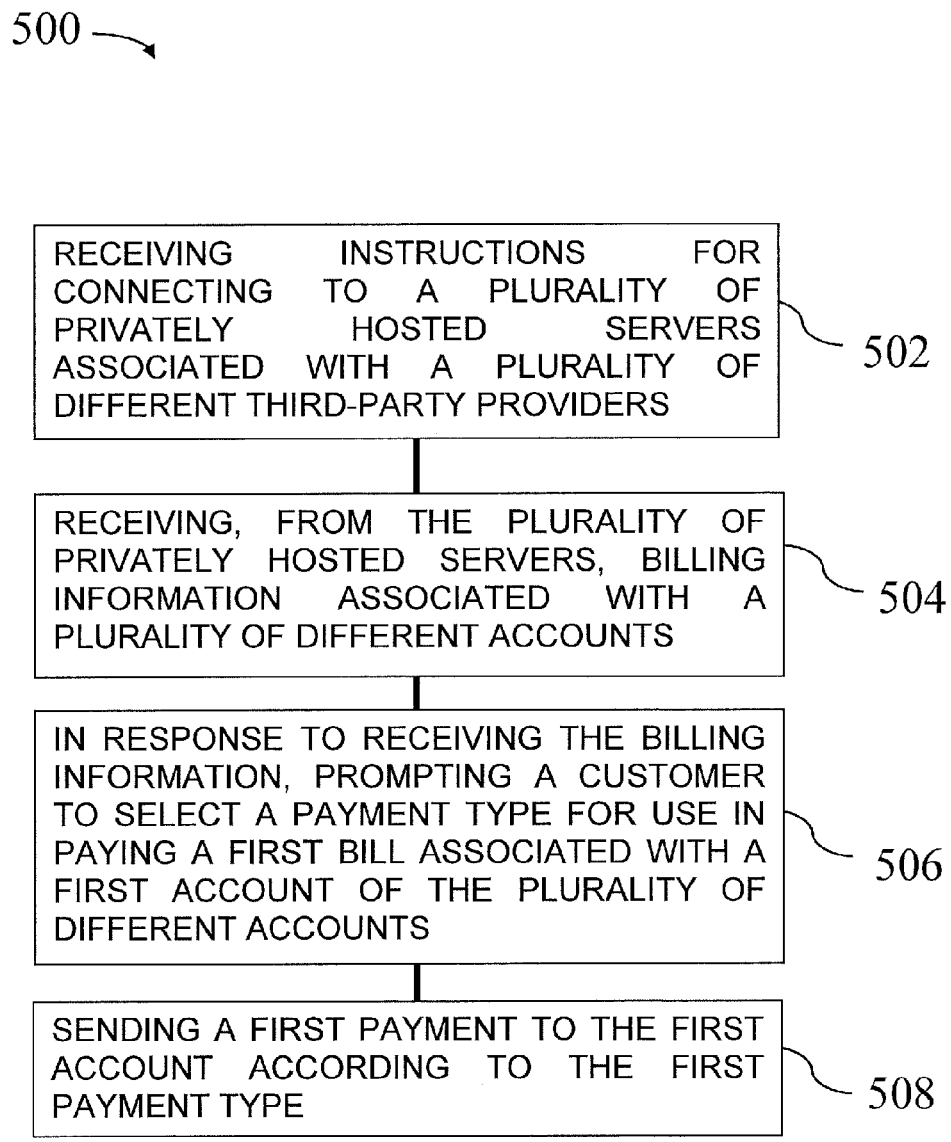
FIG. 5 is a schematic block diagram illustrating an exemplary process for capturing and storing a web page screenshot according to an embodiment of the subject matter described herein.

FIG. 5 is a schematic block diagram illustrating an exemplary process 500 for integrating payments according to an embodiment of the subject matter described herein. The process may occur at a payment integrator device or system (e.g., PI 200, FIG. 2) and advantageously obviate the need for a customer to log in to multiple accounts, a banking account, and/or any other password protected account. This advantageously allows bill payment by any user that is the customer or any user on behalf of the customer. In some embodiments, payment integrators described herein include a single device for integrating billing information, integrating payment information, and displaying the integrated information to a customer for direct bill payment thereby bypassing the need to manually log in to any account. As any person (e.g., other than the customer) may make a payment on behalf of the customer, notably, the payment integrator as described herein allows for automatic bill payment without having to log in to any account, and without having to pay by any specific method.

In block 500, a payment integrator (e.g., PI 200, FIG. 2) receives instructions for connecting to a plurality of privately hosted servers associated with a plurality of different third-party providers. The privately hosted servers may be remotely disposed from the payment integrator. The payment integrator may integrate billing and/or payment information for simplifying the payment of multiple bills, and obviating the need to maintain multiple accounts. The third-party providers may include utility (public or private) companies for providing electricity, water, gas, etc. to a customer.

In block 502, the payment integrator is configured to receive, from the plurality of privately hosted servers, billing information associated with a plurality of different accounts. Billing information may be integrated and optionally stored within the payment integrator, so that the payment integrator can notify a customer when a bill is due. Billing information may include an electronic indication of an amount billed, a due date, an account number, a customer number, etc., or the like.

In block 506 and in response to receiving the billing information, the payment integrator is configured to prompt a customer to select a payment type for use in paying a first bill associated with a first account of the plurality of different accounts. The prompt may include a one-time prompt so that the customer may store encrypted payment information within the payment integrator for making automatic payments. In other embodiments, the prompt may be associated with a predetermined date or billing cycle for prompting the customer to make a one-time payment via a contactless payment method, a magnetic stripe card, or using the encrypted payment information. In some embodiments, the prompt occurs on the due date of the respective bill.

In block 508, the payment integrator sends a first payment to the first account in response to receiving the first bill according to the first payment type. The payment may be electronic, and include payment information such as an encrypted account number, encrypted credit card number, a customer identifier, a customer account number, a due date, the amount being paid, etc., or the like. The payment integrator may send the payment via the Internet for immediate delivery to the third-party provider.

It will be appreciated that exemplary process 500 is for illustrative purposes and that different and/or additional actions may be used. It will also be appreciated that various actions associated with exemplary process 500 may occur in a different order or sequence.

It will be appreciated that payment integrator (e.g., PI 200, FIG. 2) and/or functionality described herein constitute a special purpose computer. Further, it will be appreciated that payment integrator (e.g., PI 200, FIG. 2) and/or functionality described herein can improve the technological field pertaining to electronically issuing bills, collecting payments, and/or security or authentication thereof. Payment integration advantageously obviates the need to remotely store private, secure information and/or the need for a customer to pay an electronic bill via logging in to any account and/or specify any password. This advantageously allows any person to pay a bill on behalf of a user, and allows a user to be prompted to automatically pay a bill on the due date, thereby preventing late payments.

Systems, methods, and computer readable media for integrating payments can provide, for example and without limitation, one or more of the following beneficial technical effects: more secure payments and transactions; minimized account fraud; more efficient electronic billing systems and bill payments; agnostic methods and systems for interaction with any service provider; less waste associated with paper bills; allowing any user to pay a bill on behalf of a customer; and/or obviate the need to create, log in, and/or maintain an account to pay bills.

While the subject matter has been has been described herein in reference to specific aspects, embodiments, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein can be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

What is claimed is:

1. A method for integrating multiple payments, the method comprising:
at a payment integrator device comprising a hardware platform including at least one processor, located at a utilities customer site or residence, and further comprising a mountable device, a dockable device, a television, a remote control, or a home security system console:
upon connection of the payment integrator device to the Internet, automatically detecting, by the payment integrator device, utilities local to the payment integrator device;
displaying, by the payment integrator device, a list or map of the utilities;
receiving, by the payment integrator device and from a utilities customer, selection, by the customer from the list or map of utilities, of the utilities for which the customer desires to set up billing and payment via the payment integrator device;
monitoring, by the payment integrator device, the utilities selected by the customer for billing and payment via the payment integrator device, wherein monitoring the utilities includes polling application programming interfaces associated with the utilities and determining that a payment for service provided by one of the utilities is due;
receiving, from the customer, a credit card number to be used to pay bills associated with the utilities, encrypting the credit card number, and storing the encrypted credit card number locally in a memory element of the payment integrator device and not on a server separate from the payment integrator device, wherein receiving the credit card number includes receiving the credit card number in response to the customer interfacing a near field communications (NFC) payment device with a contactless reader or swiping a magnetic stripe card through a card reader;
in response to determining that the payment is due to the one utility, prompting the customer to select a payment type for use in paying a first bill associated with services provided by the one utility; and
sending a first payment to the one utility according to the first payment type, wherein sending the first payment includes sending the encrypted credit card number from the payment integrator device to the one utility.

2. The method according to claim 1, wherein a step of logging into a password protected account is obviated.

3. The method according to claim 1, wherein the payment integrator device connects to a plurality of privately hosted servers associated with the utilities via the Internet.

4. The method according to claim 1, wherein prompting the customer to select the payment type includes automatically prompting the customer according to a predetermined billing cycle.

5. The method according to claim 1, wherein prompting the customer to select the payment type includes prompting the customer to pay the first bill on a due date associated with the first bill.

6. The method according to claim 1, wherein prompting the customer to select the payment type includes providing a visual prompt or an audible prompt.

7. The method according to claim 1, wherein sending the first payment includes sending a one-time payment.

8. The method according to claim 1, wherein the credit card number is received in response to the user interfacing the NFC payment device with the contactless reader.

9. The method according to claim 1, wherein the credit card number is received in response to the customer swiping the magnetic stripe card through the magnetic card reader.

10. A system for integrating multiple payments, the system comprising:
a payment integrator device comprising at least one processor and a communications interface configured to be located at a utilities customer site or residence, and further comprising a mountable device, a dockable device, a television, a remote control, or a home security system console, wherein:
upon connection of the payment integrator device to the Internet, the payment integrator device automatically detects utilities local to the payment integrator device;
the payment integrator device displays a list or map of the utilities;
the payment integrator device receives, from a utilities customer, selections, by the customer from the displayed list or map of utilities, of the utilities for which the customer desires to set up billing and payment via the payment integrator device;
the payment integrator device monitors the utilities selected by the customer for billing and payment via the payment integrator device, wherein monitoring the utilities includes polling application programming interfaces associated with the utilities and determining that a payment for service provided by one of the utilities is due;
the payment integrator device receives, from the customer, a credit card number to be used to pay bills associated with the utilities, encrypts the credit card number, and stores the encrypted credit card number locally in a memory element of the payment integrator device and not on a server separate from the payment integrator device, wherein receiving the credit card number includes receiving the credit card number in response to the customer interfacing a near field communications (NFC) device with a contactless reader or swiping a magnetic stripe card through a card reader to provide the credit card number to the payment integrator device;
in response to determining that the payment is due to the one utility, the payment integrator device prompts the customer, via the communications interface, to select a payment type for paying a first bill associated with services provided by the one utility; and
the payment integrator device electronically sends a first payment to the first account according to the first payment type, wherein sending the first payment includes sending the encrypted credit card number from the payment integrator device to the one utility.

11. The system according to claim 10, wherein the payment integrator device connects to a plurality of privately hosted servers associated with the utilities via the Internet.

12. The system according to claim 10, wherein the customer is automatically prompted to pay the first bill according to a predetermined billing cycle.

13. The system according to claim 10, wherein the customer is prompted to pay the first bill on a date that the first bill is due.

14. The system according to claim 10, wherein the communications interface is configured to provide a visual prompt or an audible prompt.

15. The system according to claim 10, wherein the first payment is a one-time payment to the one utility.

16. The system according to claim 10, wherein the payment integrator device comprises the contactless reader configured to obtain the credit card number from the NFC enabled payment device.

17. The system according to claim 10, wherein the payment integrator device comprises the card reader configured to obtain the credit card number from the magnetic stripe card.

18. A non-transitory computer readable medium having stored thereon executable instructions for controlling a computer to perform steps comprising:
at a payment integrator device comprising a hardware platform including at least one processor, configured to operate at a utilities customer site or residence, and further comprising a mountable device, a dockable device, a television, a remote control, or a home security system console:
upon connection of the payment integrator device to the Internet, automatically detecting, by the payment integrator device, utilities local to the payment integrator device;
displaying, by the payment integrator device, a list or map of the utilities;
receiving, by the payment integrator device and from a utilities customer, selection, by the customer from the list or map of utilities, of the utilities for which the customer desires to set up billing and payment via the payment integrator device;
monitoring, by the payment integrator device, the utilities selected by the customer for billing and payment via the payment integrator device, wherein monitoring the utilities includes polling application programming interfaces associated with the utilities and determining that a payment for service provided by one of the utilities is due;
receiving, from the customer, a credit card number to be used to pay bills associated with the utilities, encrypting the credit card number, and storing the encrypted credit card number locally in a memory element of the payment integrator device and not on a server separate from the payment integrator device, wherein receiving the credit card number includes receiving the credit card number in response to the customer interfacing a near field communications (NFC) device with a contactless reader or swiping a magnetic stripe card through a card reader to provide the credit card number to the payment integrator device;
in response to determining that the payment is due to the one utility, prompting a customer to select a payment type for use in paying a first bill associated with services provided by the one utility; and
sending a first payment to the one utility according to the first payment type, wherein sending the first payment includes sending the encrypted credit card number from the payment integrator device to the one utility.

* * * * *